United States Patent
Reese (10) Patent No.: US 6,742,005 B2
(45) Date of Patent: May 25, 2004

(54) METHOD AND SYSTEM FOR VALIDITY CHECKING A COMPUTER FILE OF CONTENT FOR ACCEPTABLE PERMITTED DESIGN ATTRIBUTES

(75) Inventor: Curtis Reese, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 364 days.

(21) Appl. No.: 09/891,479

(22) Filed: Jun. 26, 2001

(65) Prior Publication Data

US 2003/0009483 A1 Jan. 9, 2003

(51) Int. Cl.[7] ............................................. G06F 17/30
(52) U.S. Cl. ...................................................... 707/200
(58) Field of Search ........................ 382/115; 709/105; 707/104.1, 102, 103 R, 200; 715/520, 501.1; 345/760

(56) References Cited

U.S. PATENT DOCUMENTS

| | | | | |
|---|---|---|---|---|
| 5,724,273 A | * | 3/1998 | Desgrousilliers et al. | ... 702/120 |
| 5,768,592 A | * | 6/1998 | Chang | ......................... 438/758 |
| 6,185,608 B1 | * | 2/2001 | Hon et al. | ................... 709/216 |
| 6,286,013 B1 | * | 9/2001 | Reynolds et al. | ........... 707/200 |
| 6,330,575 B1 | * | 12/2001 | Moore et al. | ................ 715/513 |
| 6,397,246 B1 | * | 5/2002 | Wolfe | .......................... 709/217 |
| 6,421,453 B1 | * | 7/2002 | Kanevsky et al. | ........... 382/115 |
| 6,633,875 B2 | * | 10/2003 | Brady | .......................... 707/10 |

OTHER PUBLICATIONS

Oracel SQL * Loader The Definitive Guide, Jonathan Gennick & Sanjay Mishra, Apr. 2001.*

* cited by examiner

Primary Examiner—Safet Metjahic
Assistant Examiner—Sana Al-hashemi (57) ABSTRACT

A method for validity checking a file with permitted design features stored in a profile specification. The profile specification is defined by a plurality of page components having elements with attributes, and each attribute has an associated rule specifying the permitted design features for that attribute. The method includes the steps of selecting an attribute from the file, detecting the features of the selected attribute, finding an attribute from the profile specification that matches the selected attribute from the file and comparing a rule associated with the matched attribute from the profile specification with the detected features of the selected attribute from the file, and determining whether the matched attribute complies with the rule.

14 Claims, 6 Drawing Sheets

| WebSite Design Validation |||
|---|---|---|
| RULE PROFILE |||
| | | |
| Page Component ||| 
| Top Banner ||| 
| | Definition || 
| | Standard banner applied to each page ||
| | | |
| Design Attributes |||
| Element | Attribute | Rule |
| Navigational Buttons | | |
| | Format | Always Graphic |
| | Height | 20 Pixels |
| | Width | 530 Pixels |
| | Position | 6 Pixels from top of page |
| | Button Color | |
| | Unselected state: | Light blue (RGB: 102,153, 204) |
| | Selected State: | Darker blue (RGB: 51, 102,153) |
| | Font | 12-pt. Futura BT Medium |
| | Font Color | White (RGB: 255, 255, 255) |
| | Spacing | 20 pixel gutter between top navigational button and first element on any page |
| | End Button | 8pt. Rounded corners, no adjacent buttons |
| | | |
| Country Indicator | | |
| | Format | Always graphic |
| | Height | 10 pixels tall |
| | Width | Varies depending upon country |
| | Placement | 6 pixels from top of page |
| | Font | 9-pt. Futura BT book, 60-pt. Tracking |
| | Font Color | Black (RGB: 0, 0, 0) |
| | | |
| Logo | Format | Graphic |
| | Height | 55 Pixels |
| | Width | 66 Pixels |

METHOD AND SYSTEM FOR VALIDITY CHECKING A COMPUTER FILE OF CONTENT FOR ACCEPTABLE PERMITTED DESIGN ATTRIBUTES

The present invention generally relates to an improved method and system for validity checking a computer file of content for permitted or acceptable permitted design features stored in a profile specification. More specifically, it relates to an improved method and system for automatically validity checking a computer file defining web site content to determine whether it complies with permitted design features that are stored in a profile specification, wherein the profile specification is defined by a plurality of page components having elements with attributes, and each attribute designates a rule or specification indicating the permitted design features for that attribute.

BACKGROUND OF THE INVENTION

It is common for a web site, especially a corporate web site, to require that posted web pages meet stringent web page design specifications. The specifications can include attributes, such as color, size and font, which must meet certain requirements.

In general, a web page can be divided into multiple page components, such as the top banner, counters and tables. Each page component is further divided into elements, such as navigational buttons, country indicator and logo. From each element, there may be numerous attributes belonging to that element. Attributes can be defined as a variety of items, such as format, height, or width position. The number and types of attributes available can vary greatly depending on the element related. Similarly, the types of elements available also greatly depend on the page component involved. Although the use of "a" or "an" will sometimes be referred to for better readability, it should be understood that the use of "a" or "an" also refers to "one or more".

Because a different rule is designated to each attribute of each element of each page component, a great number of rules can be included for each web site. Further, it can take countless hours of manual labor to determine whether a particular web page meets the standard of all these rules, and the validation process can be lengthy and expensive. Consequently, there is a need for a computer implemented method and system that can automatically determine whether a particular web page meets all the permitted web site attributes.

BRIEF SUMMARY OF THE INVENTION

The present invention is directed to an improved method and system for automatically validity checking a computer or electronic file of content, such as web site content to determine if it complies with permitted design features stored in a profile specification. More specifically, it relates to such an improved method and system for validity checking a computer file defining content to determine whether the content complies with permitted design features stored in a profile specification, wherein the profile specification is defined by a plurality of page components having elements with attributes, and each attribute designates a rule indicating the permitted or acceptable design features for that attribute.

The present invention provides a method that includes the steps of selecting an attribute from the file, detecting the features of the selected attribute, finding an attribute from the profile specification that matches the selected attribute from the file, and comparing a rule designated to the matched attribute from the profile specification with the detected features of the selected attribute from the file.

The present invention provides a further method that includes the steps of selecting a page component from the file, selecting an element of the selected component, selecting an attribute of the selected element, detecting the features of the selected attribute, finding an attribute from the profile specification that matches the selected attribute, and comparing a rule designated to the matched attribute from the profile specification with the detected features of the selected attribute.

DETAILED DESCRIPTION

Broadly stated, the present invention is directed to an improved method and system for validity checking a file with permitted design features stored in a profile specification. Generally, a profile specification is a set of allowed web page components and their associated attributes and rules. This collection of information is stored in a database so that it can be compared to candidate web pages. In the preferred embodiment, the profile specification is preferably defined by a plurality of page components having elements with attributes, and each attribute designates a rule indicating the acceptable or permitted design features for that attribute. The method and system provide a way to automatically validate that a file meets the standards of allowable web site design attributes. An attribute from the file is first selected, and its features are then detected. Next, the present invention finds an attribute from the profile specification that matches the selected attribute from the file. Once an attribute from the profile specification is found, a comparison of a rule designated to the matched attribute from the profile specification with the detected features of the selected attribute from the file is then done.

Figure 1:
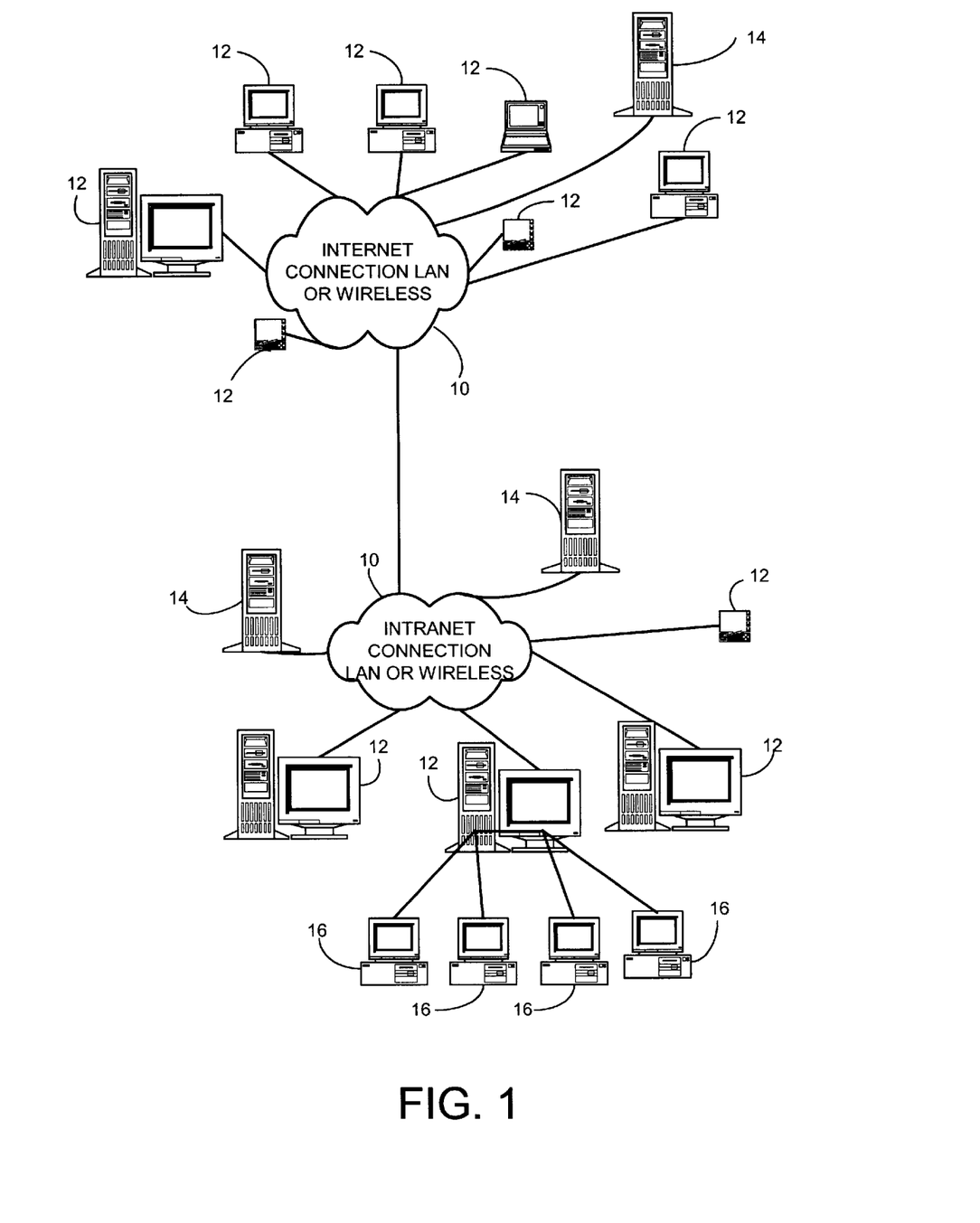
FIG. 1 is an exemplary schematic diagram of a network system in which the present invention can be implemented.

Turning now to the drawings and particularly FIG. 1, the system in which the present invention can be implemented as part of a preferred wide area network is shown. A plurality of client computers ("clients") 12 is connected to a plurality of network servers ("servers") 14 via the network 10. As an example, the clients 12 can be network servers, which in turn are connected to workstations 16 within an intranet. However, the client 12 can also be a hand-held personal digital assistant. Currently, the servers are preferably implemented to provide processes of the present invention. The clients 12, on the other hand, are preferably any standard computer that has access to the server.

The present invention can be implemented using a variety of connections as well, such as the Internet or a wireless communication system. The connection functions primarily allow the server and the client to communicate and transfer data, preferably but not necessarily using real time communication. In the case of an Internet connection, the clients 12 can be standard computers with access to the World Wide Web. In this implementation, only the servers 14 must be configured for the present invention.

The Internet is the preferable network connection 10 because it provides a very flexible and universal way of communicating. However, the present invention can be implemented practically in any number of ways, ranging from a large scale network to a standalone personal computer, that may also change with evolving technology. To further the complexity of the various network types that may be available, issues of bandwidth, reliability and security of the network are important considerations. As a result, an explanation of the current preferred embodiment of the network topology is given as an example and other networks and connections are contemplated and within the scope of the present invention.

Figure 2:
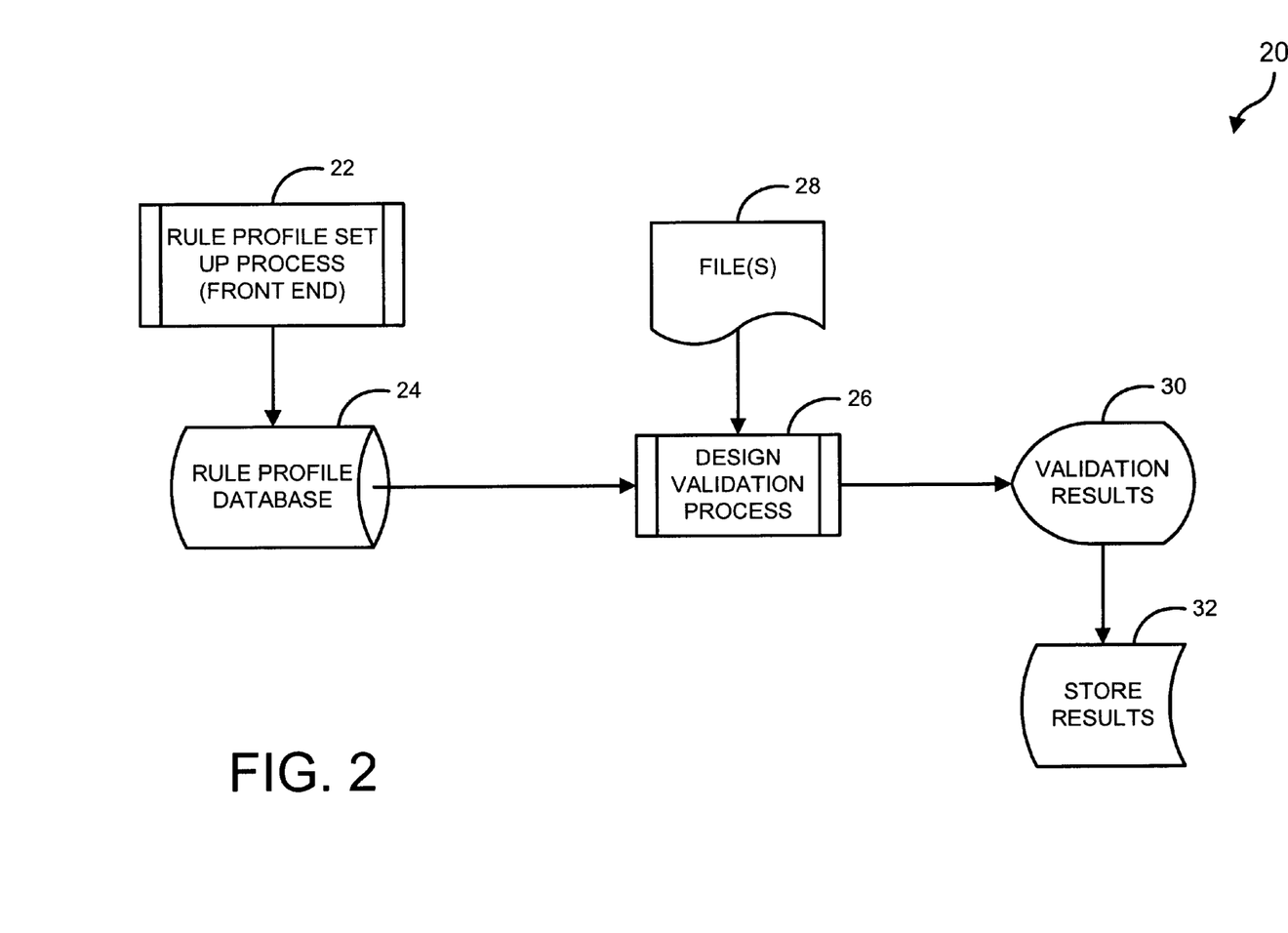
FIG. 2 is a flow chart illustrating the preferred overall general scheme of the present invention.

A flow chart of the preferred overall general scheme of the present invention is shown in FIG. 2 and indicated generally at 20. A profile specification set up process 22 is included for users to set up various profile specification s, which are stored to a profile specification database 24. A design validation checking process 26 is linked to the profile specification database, and it checks a file 28 by comparing attributes of the content of the file with a profile specification that has been selected by the user. The results 30 from the design validation process 26 are obtained and preferably stored 32 on a user's local computer. Although this is the preferred overall general scheme of the system contemplated, it is important to note that customization and variation from the preferred scheme is contemplated, especially to meet the demand of different professions and administration structures. Thus, it should be understood that these other implementations are within the scope of the present invention.

Figure 3:
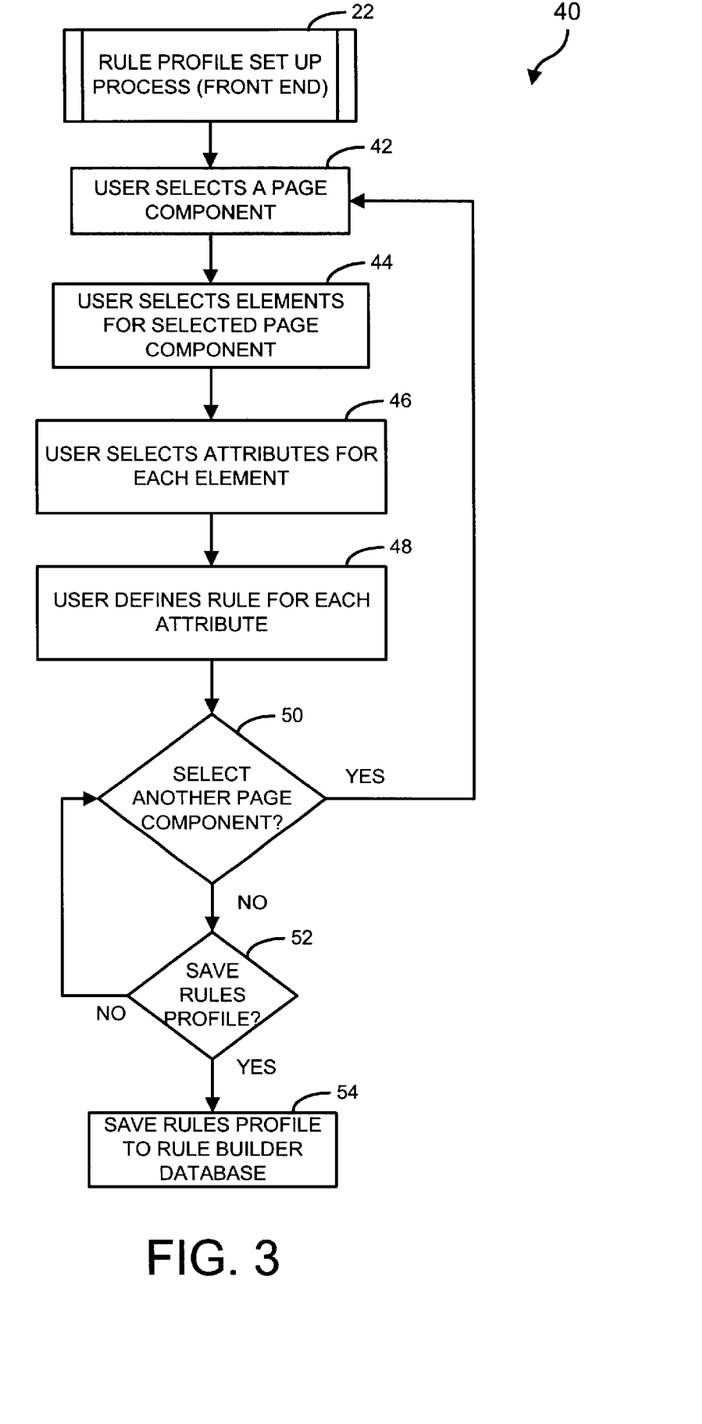
FIG. 3 is a flow chart illustrating the preferred functionality of a method for setting the profile specification shown in FIG. 2.

The flow chart of FIG. 3 illustrates the preferred functionality of the profile specification set up process 22 and is indicated generally at 40. Preferably, the profile specification set up process 22 is implemented with web pages available on a web site so that users can set up various profile specification s for storage to the profile specification database. The first step is to allow a user to select a page component (block 42). After a page component is selected, the user can then select elements for the selected page component (block 44). The user must further select attributes for each selected elements (block 46), and define a rule for each attribute (block 48). After the user finishes defining rules for the attributes, it must be determined whether the user wishes to select another page component for the profile specification (block 50). If so, users are looped back to select another page component for the set up process (block 42). Otherwise, the user will be prompted to determine whether to save the profile specification that has been set up (block 52). If indicated by the user (block 52), the profile specification will be accordingly saved to the profile specification database (block 54). However, if the user does not wish to save the profile specification at that time (block 52), the process loops back for the user to select another page component (block 50).

Figure 4:
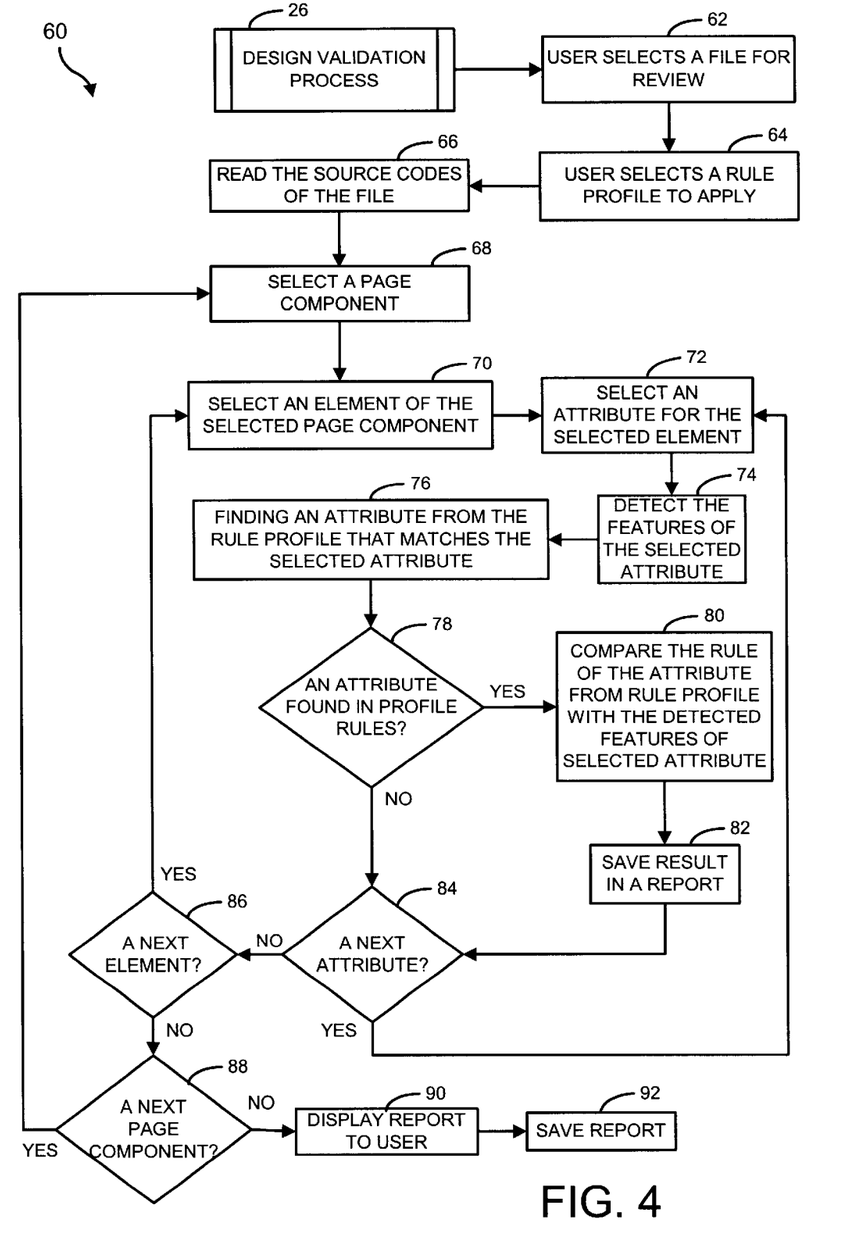
FIG. 4 is a flow chart illustrating the preferred functionality of a method for the design validation process shown in FIG. 2.

A flow chart of the preferred functionality of the design validation process 26 is shown in FIG. 4, and indicated generally at 60. Once the design validation checking process has been requested by the user, the user selects a file, such as a web page or a document, for review (block 62). The user next selects a profile specification to apply for the validation process (block 64). After the necessary selections have been made, the source codes of the file are then read (block 66) by the server. After the source codes are read (block 66), a page component is selected from the file (block 68), which is followed by an element of the selected page component being selected (block 70). From the selected element of the page component, an attribute is selected from the selected element (block 72). The features of the selected attribute are then detected by the server (block 74).

Using the selected attribute, the next step is to find an attribute from the profile specification selected earlier that matches this selected attribute from the file (block 76). It is determined next whether such an attribute is found in the profile specification (block 78). If so, the rule associate with the matched attribute from the profile specification is then compared to the detected features of the selected attribute (block 80), and the result from the comparison is saved to a report (block 82).

Once either the result has been saved to the report (block 82) or a matched attribute cannot be found in the profile specification (block 78), it is next determined whether there is a next attribute for the selected element (block 84). If there is another attribute for the selected element (block 84), the process loops back to select this attribute (block 72) to repeat the process. On the other hand, if there is no other attribute (block 84) for the selected element, it is then determined whether there is a next element for the selected page component (block 86).

Again, if there is a next element for the selected page component (block 86), the process loops back to select this next element (block 70) to repeat the process. Otherwise, a determination of whether there is another page component in the file will be made (block 88), and accordingly the process loops back to select the page component (block 68) if it exists (block 88). However, if there is no other page component available in the file (block 88), the report will preferably be displayed to the user (block 90), followed by a step of saving the report on the user's client (block 92).

Because the present invention can be implemented to validate various files, the preferred methods for these implementations may be different. As a result, it should be understood that the preferred functionality of the processes can vary greatly, and these alternative processes should be considered within the scope of the present invention. However, for clarity, examples for use with a web site design implementation will be shown and described in FIGS. 5 and 6.

Figure 5:
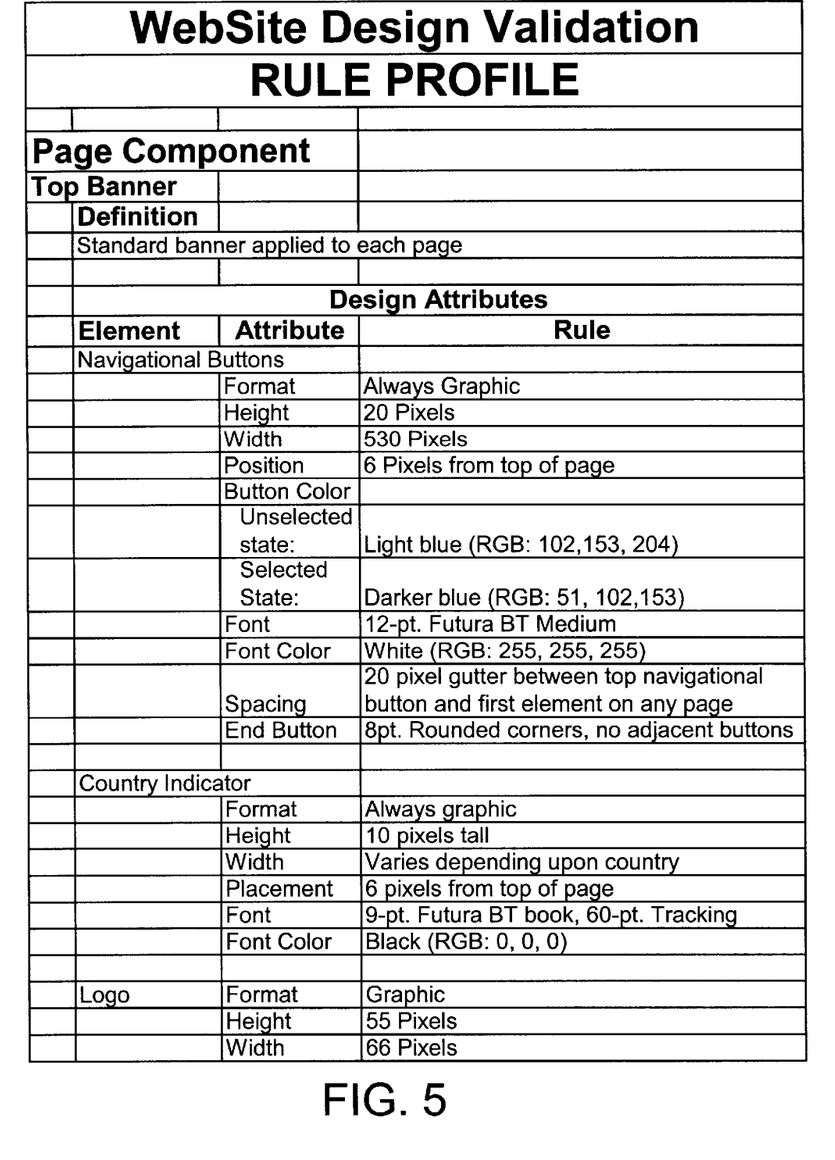
FIG. 5 illustrates an example database of a profile specification.

An example database of a profile specification is shown in FIG. 5. As shown, the profile specification includes a page component, which is defined as the "top banner." The page component (e.g., top banner) includes multiple elements, such as navigational buttons, a country indicator and logo. Within each element, attributes relating to that element are defined. For example, there are three attributes assigned to the element "logo," specifically format, height and width. As one can imagine from this example, a web site design profile specification can be hundreds of pages, containing thousands of these various attributes that belong to different elements and page components. It should therefore be understood that manual validating such a database would be very time consuming and costly.

Figure 6:
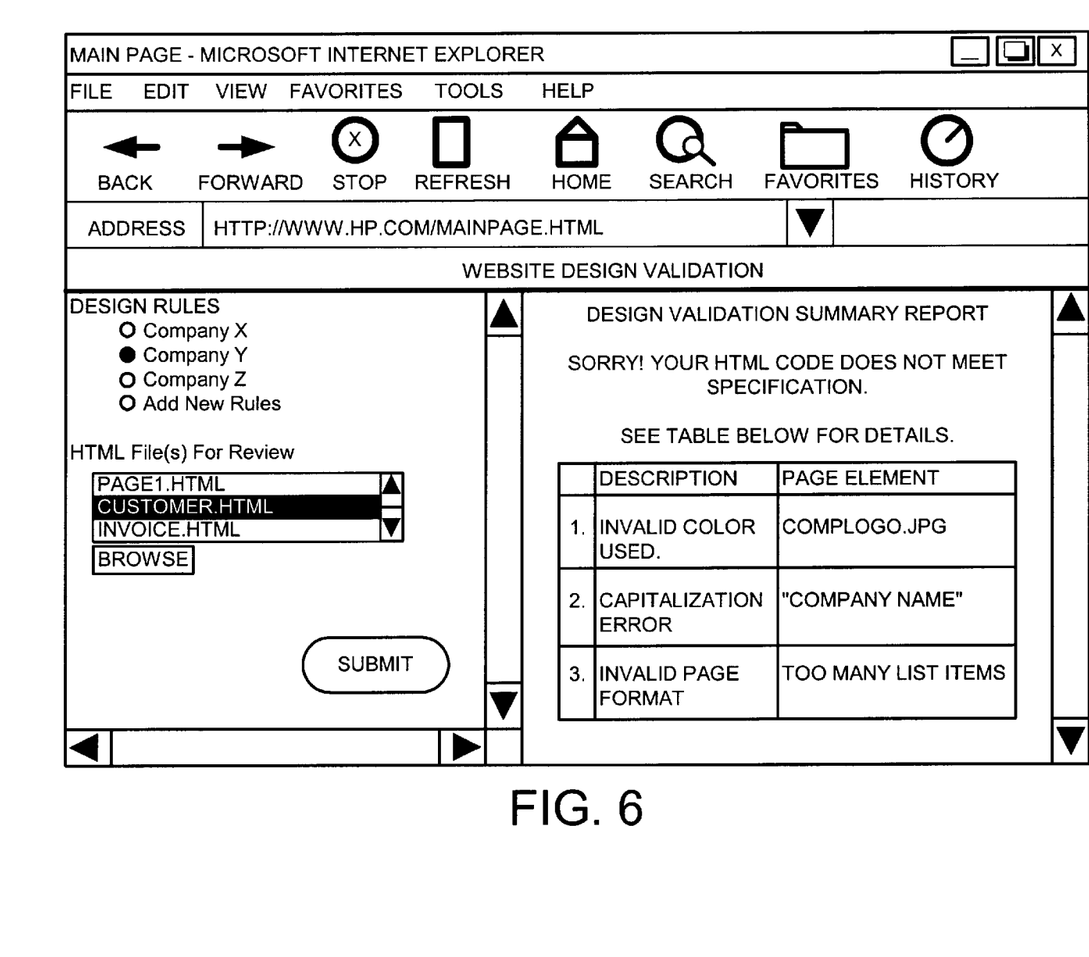
FIG. 6 illustrates an example of one of the web pages for selecting user configurations and displaying a report of the validation process.

An example of one of the web pages for selecting user configurations and displaying a report of the validation process is shown in FIG. 6. On one side of the web page, there is a selection for the available profile specifications in which one of them has been selected (e.g., Company Y). Also shown, the user can add a new profile specification (e.g., Add New Rules), and will initiate the profile specification set up process shown in FIG. 3 if submitted. Underneath the profile specification selection, the user is also able to select a file, which is a html file in this example. Any selections by the user are preferably made by selecting one or more items that have been predefined and placed on the web page. This eliminates the possibility of excluding items that would not be found during a search because the user used language that was different from a normal or expected description of an item. However, the present invention may also permit the use of user defining key words to find a profile specification for example, if desired.

Located on the other side of the web page, a report detailing the error found during the design validation process is displayed. A table listing is used in this example. Of course, FIG. 6 is simply one example of how the web page can be configured. As it is known in the art, other web page designs can be used without alternating the general concept of the present invention.

From the foregoing description, it should be understood that an improved method and system for validity checking a file with permitted design attributes stored in a profile specification has been shown and described, which has many desirable attributes and advantages. As a result, costly and time consuming manual labor can be minimized with the use of the present invention. Furthermore, the present invention also provides a validity checking system that can minimize human error.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

What is claimed is:

1. A method for automatically validity checking a computer file defining content to determine whether the content complies with permitted design features stored in a profile specification, wherein the profile specification is defined by a plurality of page components having elements with attributes, and each attribute designates a rule indicating the permitted design features for that attribute, comprising the steps of:
   selecting an attribute from the file;
   detecting the features of the selected attribute;
   finding a matched attribute;
   comparing a rule to the matched attribute from the profile specification with the detected features of the selected attribute from the file; and,
   determining whether the matched attribute complies with the rule,
   wherein finding a matched attribute includes the steps of:
      determining whether the profile specification contains an attribute that matches the selected attribute from the file; and
      when the profile specification is determined not to contain an attribute that matches the selected attribute from the file:
         determining whether there is a next attribute for the same element of the selected attribute;
         selecting the next attribute whether there is a next attribute for the same element; and
         determining whether there is a next element for the same page component of the selected attribute when there is not a next attribute for the same element.

2. The method according to claim 1 wherein said file content is a web page, and said profile specification comprises rules relating to permitted design attributes of a web site.

3. The method according to claim 1 wherein said profile specification is a set of allowed page components, and each component has a plurality of associated attributes and rules.

4. The method according to claim 1 further comprising repeating the steps of claim 1 for a next attribute from the file until all attributes in the file have been processed.

5. The method according to claim 1 further comprising the step of preparing a report using the results of the comparisons.

6. The method according to claim 5 further comprising the steps of:
   displaying the report to a user; and
   saving the report in memory.

7. The method according to claim 1 wherein prior to said step of selecting an attribute further comprising the steps of:
   selecting a file by the user; and
   selecting a profile specification by the user.

8. The method according to claim 1 wherein prior to said step of selecting an attribute further comprising the step of reading the source codes of the file.

9. The method according to claim 1 wherein prior to said step of selecting an attribute further comprising the steps of:
   selecting a page component of the selected attribute; and,
   selecting an element of the selected component.

10. The method according to claim 1 wherein finding a matched attribute further includes the steps of:
    selecting the next element when there is a next element for the same page component of the selected; and
    when there is not a next element for the same page component of the selected attribute, determining whether there is a next page component in the file and selecting the next page component when there is a next page component.

11. A method for automatically validity checking a computer file defining content of at least a portion of a website to determine whether the content complies with permitted design features stored in a profile specification, wherein the profile specification is defined by a plurality of page components having:
   elements with attributes, and each attribute having an associated rule specifying the permitted design features for that attribute, comprising:
      selecting a page component from the file;
      selecting an element of the selected component;
      selecting an attribute of the selected element;
      detecting the features of the selected attribute;
      finding an attribute from the profile specification that matches the selected attribute;
      comparing a rule designated to the matched attribute from the profile specification with the detected features of the selected attribute;
      determining whether the matched attribute complies with the rule;
      determining whether there is a next attribute for the selected element when a matched attribute from the profile specification is not found;
      selecting the next attribute when there is a next attribute for the selected element; and,
      determining whether there is a next element for the selected page component when there is not a next attribute for the selected element.

12. The method according to claim 11 further comprising the steps of:
   selecting the next element when there is a next element for the selected page component;
   determining whether there is a next page component when there is not a next element for the selected page component; and,
   selecting the next page component when there is a next page component.

13. A computer program product comprising a computer usable medium having computer readable program codes embodied in the medium that when executed causes a computer to:
   select an attribute from a file;
   detect a design feature of the selected attribute;
   find a matched attribute; and
   compare a rule associated with the matched attribute from the profile specification with detected design features of the selected attribute from the file,
   wherein the program codes that cause the computer to find a matched attribute include program codes that when executed cause the computer to:
      determine whether a profile specification contains an attribute that matches the selected attribute from the file; and
      when the profile specification is determined not to contain an attribute that matches the selected attribute from the file:
         determine whether there is a next attribute for the same element of the selected attribute;
         select the next attribute when there is a next attribute for the same element; and
         determine whether there is a next element for the same page component of the selected attribute when there is not a next attribute for the same element.

14. A computer program product comprising a computer usable medium having computer readable program codes embodied in the medium that when executed causes a computer to:
   select a page component from the file;
   select an element of the selected component;
   select an attribute of the selected element;
   detect the features of the selected attribute;
   find an attribute from a profile specification that matches the selected attribute;
   compare a rule associated with the matched attribute from the profile specification with the detected features of the selected attribute;
   determine whether there is a next attribute for the selected element when a matched attribute from the profile specification is not found;
   select the next attribute when there is a next attribute for the selected element; and,
   determine whether there is a next element for the selected page component when there is not a next attribute for the selected element.

* * * * *